May 27, 1958 J. REES 2,836,530
METHOD OF MAKING FORMING TOOLS
Filed April 19, 1954
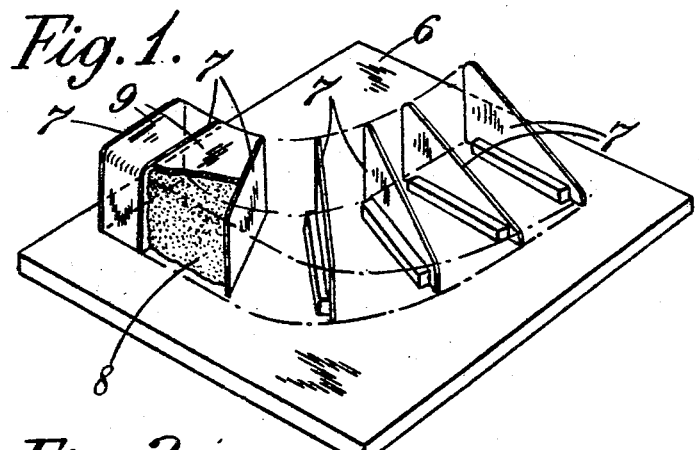
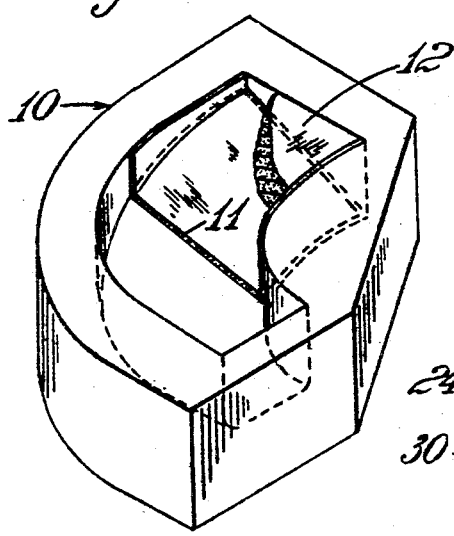
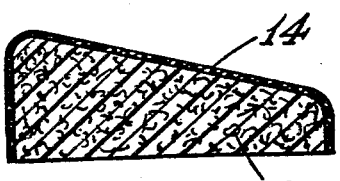
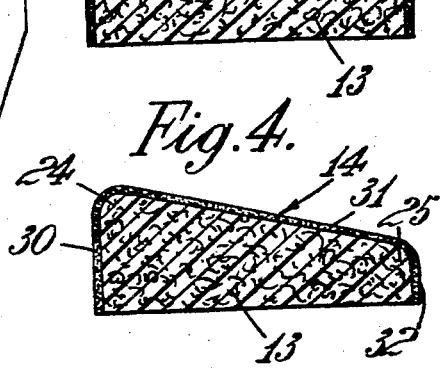
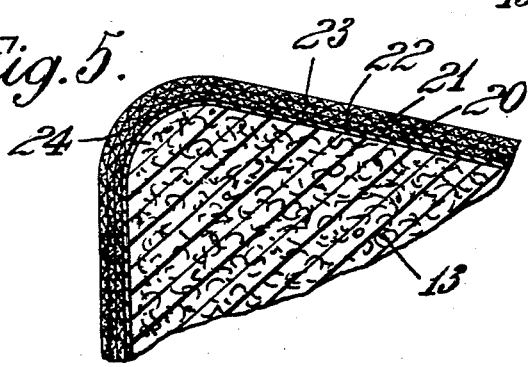

United States Patent Office 2,836,530
Patented May 27, 1958

2,836,530

METHOD OF MAKING FORMING TOOLS

John Rees, Bristol, England, assignor, by mesne assignments, to Bristol Aircraft Limited, Bristol, England, a British company Application April 19, 1954, Serial No. 424,167

Claims priority, application Great Britain April 28, 1953

5 Claims. (Cl. 154—110)

This invention relates to the construction and manufacture of forming tools such as beating blocks, rubber press tools and drop-hammer tools, used in the production of components from sheet metal and other materials. Tools of this kind made from fibrous material bonded with resin are described in British patent application No. 25,258/51, and the present invention provides an improved construction and method of production of tools of this kind giving greater dimensional accuracy and surface strength.

According to the present invention, a method of making a forming tool for use in manufacturing components from sheet metal comprises the steps of:

(a) Coating the moulding surface of a mould which is a negative counterpart of the shape of the tool to be produced with an thin spacing layer of an easily removable material to which settable resin substance will not adhere strongly, (b) Casting a core in the mould by packing onto the coated moulding surface a plastic mass composed of a filler material mixed with a settable resin substance and allowing or causing the resin to set, (c) Withdrawing the core from the mould and removing any material of the spacing layer from it, (d) Removing any material of the spacing layer from the moulding surface, and (e) Replacing the core in the mould but with a layer of surfacing material of a thickness substantially equal to that of the spacing layer and composed of filler material impregnated with a settable resin substance interposed between the core and the moulding surface of the mould, and allowing or causing the resin substance of the surface layer to set.

The tool, comprising the core carrying the surface layer adhering to it, is then removed from the mould.

It will be appreciated that in carrying out this method any shrinkage which occurs in the core material during setting will not affect the dimensional accuracy of the finished tool, while the amount of shrinkage which can occur in the separately applied surface layer is so small, owing to the thinness of the layer, as to be negligible.

Preferably, the layer of surfacing material is applied to the moulding surface of the mould before the core is replaced, but if desired, the layer of surfacing material may be applied to the core.

According to a feature of the present invention, at least a part of the surface layer which is interposed between the core and the moulding surface of the mould may be composed of woven or felted fibrous material impregnated with a resin substance which after setting is thermally stable, while the core and any remaining parts of the surface layer may be made from a loose filler material mixed with settable resin substance which is thermally stable after setting.

Thus, according to this feature, those parts of the surface layer which are required to have the greatest strength in the finished tool may be formed from impregnated woven or felted material. Such parts are generally the edges of the tool.

By employing material of higher quality, and therefore cost, in the surface layer, and using material of lower quality for the core, a tool with good surface strength and finish can be obtained at less cost than a tool made of homogeneous material throughout and having the same surface strength and finish.

A method in accordance with the present invention, will now be described, merely by way of example, and in relation to the production of a beating block for a metal duct bend changing from triangular to rectangular section.

The method will be described with reference to the accompanying drawings in which, Figure 1 is a perspective view of a pattern, in course of production, of the forming tool which is to be produced, Figure 2 is a perspective view of a negative mould showing the spacing layer applied to the moulding face of the mould, and the core forming material packed in the mould, Figure 3 is an elevation in cross-section of the finished tool having a surface layer composed wholly of impregnated woven fibrous material, Figure 4 is an elevation in cross-section of the finished tool having a surface layer composed in part only of impregnated woven fibrous material, and Figure 5 is a part of Figure 4 to a larger size and showing in detail the formation of an impregnated woven fibrous material part of the surface layer.

In carrying out the method, if a prototype or other existing sample of the duct bend is available, this may be used directly as a mould for the beating block, otherwise a suitable mould is made to the exact dimensions required. A convenient method of making such a mould is as follows:

Referring to Figure 1 a pattern is first made corresponding exactly to the shape of the beating block by erecting on a base board 6 a framework of wooden formers 7 shaped from lofted templates, the numbers, spacing and arrangement of the formers being suitably chosen to define with sufficient accuracy the curved shape of the duct bend panel. The spaces between the formers 7 are then filled with clay 8 apart from a surface area which is filled with a layer 9 of water-setting plaster.

When the plaster has set the surface may be trimmed to remove any irregularities and then coated with shellac varnish, which helps to harden the surface layer and acts as a parting agent in the next step, which consists in taking a negative plaster cast 10 (Figure 2). In some cases an existing component can be used as the pattern and the negative cast taken directly from it. In other cases an existing component may be used as a mould to produce a positive pattern, and the negative mould is then produced from this pattern, or the component itself may be used directly as the negative mould.

When fully set any necessary smoothing of the moulding surface of the negative mould 10 is carried out, and the moulding surface is then coated uniformly with a thin spacing layer 11 of an easily removable material to which settable resin substances will not adhere strongly. In the method which is now being described, the spacing layer 11 is of wax or clay, and is made about 0.05 inch thick. Next, a stiff dough 12 made by adding glass fibre to a suitable liquid resin is packed into the mould and onto the mould surface which is covered by the spacing layer 11.

Waste fibre from the manufacture of glass fibre and its products is suitable for use in making the dough 12 and there is also the advantage that the waste fibre is comparatively cheap. Instead of glass fibre, material of a similar nature, such as asbestos flock may be used, however, or alternatively, for some purposes, a granular filler material such as wood sawdust or sand in suitable. Where considerations of strength permit, some porosity of the core is allowable. The liquid resin is preferably of a polyester type which sets under atmospheric or low pressure at room temperature. A resin which has been found satisfactory for this purpose is marketed under the trade name "Marco Resin 28 C."

When the resin has set the cast core 13 (see Figure 3) is withdrawn from the mould 10 and the wax or clay of the layer 11 is melted or washed off the mould and also off the core if any is adhering to it. A film of parting agent such as wax is then applied to the moulding surface of the mould, which is next lined with a surface layer 14 (see Figure 3) composed of pieces of fabric such as 20, 21, 22 (see Figure 5) woven from glass fibre, or pieces of felt or pieces of thin asbestos-millboard, which have been thoroughly impregnated with a liquid resin. The pieces are cut to a shape and size most conveniently to build up a substantially uniform layer about 0.05 inch thick, i. e. the same thickness as the spacing layer 11, or possibly a little more if the core 13 is made of a mixture subject to much shrinkage on setting. For the impregnation of the surface layer material it is preferred to use a cold-setting epoxy or ethoxylene casting resin, but the same resin as is used for the core can also be used satisfactorily. The core 13 is then given a coating 23 of the impregnating resin of the surface layer material to facilitate adhesion between the core and the surface layer, and the core is well pressed into position against the surface layer so as to force out any air bubbles. After allowing a sufficient time for the resin to set, the block generally indicated at 30 (see Figure 3) comprising the core 13 carrying the surface layer 14 is removed from the mould 10 and will have a surface finish equivalent to that of the latter and dimensions corresponding accurately to it. During production of the tool as described, if more convenient in any particular case, the surface layer 14 may be applied to the surface of the core 13 instead of to the moulding surface of the mould 10.

With the method described, any shrinkage in the core 13 while it is setting will not affect the dimensional accuracy of the finished beating block because any core shrinkage can be made up by making the surface layer 14 a little thicker than the original spacing layer 11. The spacing layer is made thin enough, however, so that any shrinkage occurring in the surface layer when applied and set is so small as to be negligible owing to the thinness of the surface layer.

The method just described may be modified by building up the surface layer 14 from pieces of fabric woven from glass fibre impregnated with liquid resin or pieces of resin impregnated felt or millboard as previously described only where the surface layer is required to have the greatest strength, the remainder of the surface layer being built up with doughy material similar to that used for making the core 13.

Figures 4 and 5 illustrate the beating block when made in this manner. Referring to these figures, at the corners 24, 25 of the block the surface layer 14 is composed of superimposed pieces 20, 21, 22, of impregnated glass fibre cloth while the remaining portions 30, 31, 32 of the surface layer are composed of loose fibrous material such as glass or asbestos fibres bonded with resin. In all other respects, the modified method corresponds with the first method described.

I claim:

1. A method of making a forming tool for use in manufacturing components from sheet metal, which method comprises the steps of: (a) coating the moulding surface of a mould which is a negative counterpart of the shape of the tool to be produced with a thin spacing layer of an easily removable material to which settable resin substance will not adhere strongly, (b) casting a core in the mould by packing onto the coated moulding surface a plastic mass composed of a filler material mixed with a settable resin substance and allowing or causing the resin to set, (c) withdrawing the core from the mould, (d) removing all the material of the spacing layer remaining on the moulding surface, (e) removing from the core all the material, if any, of the spacing layer adhering to the core, (f) lining the mould with a layer of surfacing material of a thickness substantially equal to that of the spacing layer, but sufficient to take up any additional space in the mould resulting from shrinkage of the core during setting, said surfacing material being composed of filler material impregnated with a settable resin substance, and (g) replacing the core in the mould, and allowing or causing the resin substance of the surface layer to set.

2. A method of making a forming tool for use in manufacturing components from sheet metal, which method comprises the steps of, (a) coating the moulding surface of the mould which is a negative counterpart of the shape of the tool to be produced with a thin spacing layer of an easily removable material to which settable resin substance will not adhere strongly, (b) casting a core in the mould by packing onto the coated mould surface a plastic mass of a filler material mixed with a liquid resin which sets under low pressure at room temperature, and allowing the resin to set, (c) withdrawing the core from the mould, (d) removing all the material of the spacing layer remaining on the moulding surface from the moulding surface, (e) removing from the core all the material, if any, of the spacing layer adhering to the core, (f) lining the mould with a layer of surfacing material of a thickness substantially equal to that of the spacing layer, but sufficient to take up any additional space in the mould resulting from shrinkage of the core during setting, said surfacing material being composed of filler material impregnated with a settable resin substance and, (g) replacing the core in the mould, and allowing or causing the resin substance of the surface layer to set.

3. A method of making a forming tool for use in manufacturing components from sheet metal, which method comprises the steps of, (a) coating the moulding surface of a mould which is a negative counterpart of the shape of the tool to be produced with a thin spacing layer of an easily removable material to which settable resin substance will not adhere strongly, (b) casting a core in the mould by packing onto the coated mould surface a plastic mass composed of loose filler material mixed with a settable resin substance which is thermally stable after setting, and allowing or causing the resin to set, (c) withdrawing the core from the mould, (d) removing all the material of the spacing layer remaining on the moulding surface from the moulding surface, (e) removing from the core all the material, if any, of the spacing layer adhering to the core, (f) lining the mould with a surface layer of surfacing material of a thickness substantially equal to that of the spacing layer, but sufficient to take up any additional space in the mould resulting from shrinkage of the core during setting, at least part of said surface layer being composed of flexible fibrous sheet material impregnated with a resin substance which after setting is thermally stable, and the remainder of the surface layer, if any, being composed of loose filler material mixed with a settable resin substance which is thermally stable after setting, and then (g) replacing the core in the mould, and allowing or causing the resin substance of the surface layer to set.

4. A method of making a forming tool for use in manufacturing components from sheet metal, which method comprises the steps of, (a) coating the moulding surface of a mould which is a negative counterpart of the shape of the tool to be produced with a thin spacing layer of an easily removable material to which settable resin substance will not adhere strongly, (b) casting a core in the mould by packing onto the coated mould surface a plastic mass of a loose filler material mixed with a liquid resin which sets under low pressure at room temperature, and allowing the resin to set, (c) withdrawing the core from the mould, (d) removing all the material of the spacing layer remaining on the moulding surface from the moulding surface, (e) removing from the core all the material, if any, of the spacing layer adhering to the core, (f) lining the mould with a surface layer of surfacing material of a thickness substantially equal to that of the spacing layer, but sufficient to take up any additional space in the mould resulting from shrinkage of the core during setting, at least part of said surface layer being composed of fibrous flexible sheet material impregnated with a liquid resin which sets under low pressure at room temperature, the remainder of the surface layer, if any, being composed of a plastic mass of loose filler material mixed with a liquid resin which sets under lower pressure at room temperature, and then (g) replacing the core in the mould and allowing the resin of the surface layer to set.

5. A method of making a forming tool for use in manufacturing components from sheet metal, which method comprises the steps of: (a) coating the moulding surface of a mould which is a negative counterpart of the shape of the tool to be produced with a thin spacing layer of an easily removable material to which settable resin substance will not adhere strong, (b) casting a core in the mould by packing onto the coated moulding surface a plastic mass composed of a filler material mixed with a settable resin substance and allowing or causing the resin to set, (c) withdrawing the core from the mould, (d) removing all the material of the spacing layer remaining on the moulding surface from the moulding surface, (e) removing from the core all the material, if any, of the spacing layer adhering to the core, (f) lining the mould with a layer of surfacing material of a thickness substantially equal to that of the spacing layer, but sufficient to take up any additional space in the mould resulting from shrinkage of the core during setting, said surfacing material being composed of filler material impregnated with a settable resin substance, and (g) coating the moulded surface of the core with a layer of settable resin substance, and then (h) replacing the core in the mould, and allowing or causing the unset resin substance in the mould to set.

References Cited in the file of this patent

UNITED STATES PATENTS

| | | |
|---|---|---|
| 2,189,154 | Stewart | Feb. 6, 1940 |
| 2,560,599 | Ryan | July 17, 1951 |
| 2,626,223 | Sattler et al. | Jan. 20, 1953 |
| 2,682,111 | Kish | June 29, 1954 |
| 2,706,832 | Frost et al. | Apr. 26, 1955 |
| 2,724,868 | Kish | Nov. 29, 1955 |

FOREIGN PATENTS

| | | |
|---|---|---|
| 563,126 | Great Britain | Aug. 1, 1944 |
| 672,144 | Great Britain | May 14, 1952 |